Dec. 9, 1969  J. M. BYNUM  3,482,864
FLUID SEALED JOINT
Filed March 26, 1968
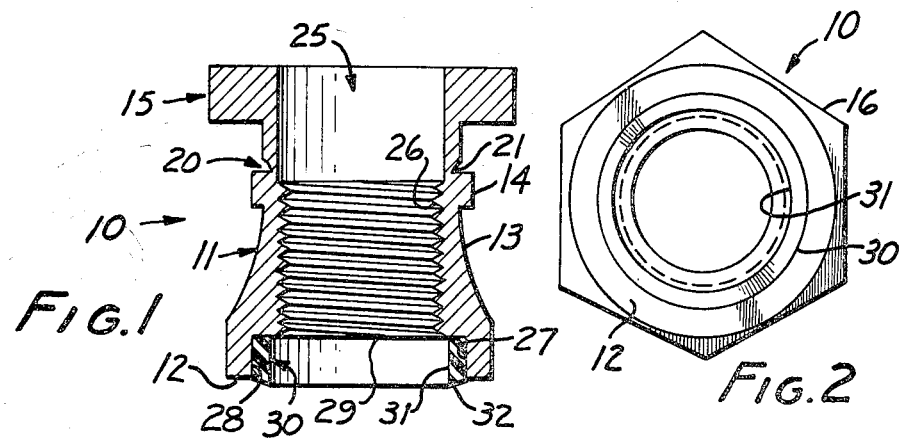
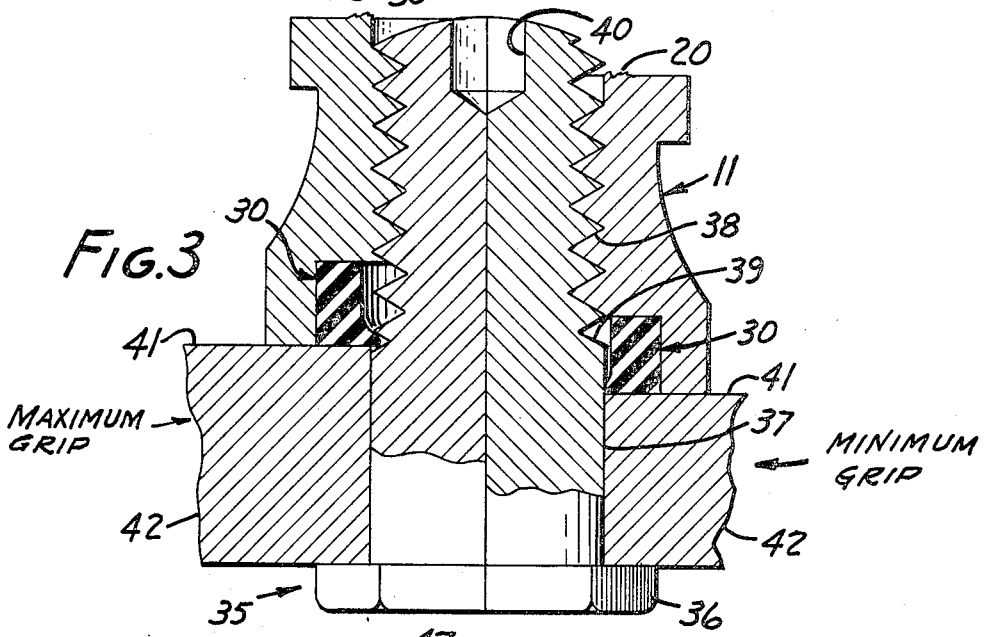
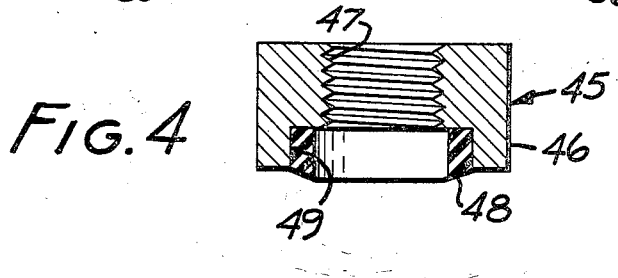
INVENTOR.
JERRY M. BYNUM
BY
ATTORNEYS.

United States Patent Office 3,482,864
Patented Dec. 9, 1969

3,482,864
FLUID SEALED JOINT
Jerry M. Bynum, Torrance, Calif., assignor to Hi-Shear Corporation, Torrance, Calif., a corporation of California
Filed Mar. 26, 1968, Ser. No. 716,119
Int. Cl. F16b 1/00, 5/00, 7/00
U.S. Cl. 287—189.36      10 Claims

ABSTRACT OF THE DISCLOSURE

A joint including a workpiece having a hole therethrough which is to be sealed, a fluid-sealing nut, and a bolt passing through the hole wherein the seal between the nut and the bolt is made in such a manner as not to interfere with the thread system, nor with its torque levels, and which, because of this non-interference, is useful in joints in which the relationship between axial pre-load and applied torque is critical as a matter of design. Because of this feature, this fastener is useful in those systems wherein the torque is inherently limited such as by the use of shear sections therein.

---

This invention relates to a fluid-sealed joint which includes a threaded bolt and a threaded nut, which nut is provided with a seal that does not interfere with the threaded system or with the function of the thread system.

The sealing of a threaded fastener so that there will be no fluid flow past the shank of the bolt or pin has been attempted and, in many applications, has been successfully accomplished. Convention technique frequently use peripheral seals, such as chevron rings, packing glands, and the like, or even deformable sealing collars which are intended to engage the bolt thread. Many of these conventional techniques effectively fulfill many useful objectives and are in widespread use. However, with advancing fastener technology, especially in the aerospace industry, it has been found necessary to use threaded fasteners wherein the relationship between applied torque and the axial pre-load, i.e. axial stretch on the assembled fastener, is a critical item of design. Many joints are designed with the axial pre-load as a prime consideration, because this realtes to the fatigue resistance of the joint itself.

The axial pre-load is at least theoretically a function of the torque which is applied to the nut, and the fewer the variables, the closer this relationship will be. This eliminates most, if not all, of the conventional solutions to the fluid-sealing problem, because in general their sealing devices make contact with the threads of the bolt, or require substantial compression, both of which utilize energy applied as torque which otherwise would be applied as axial pre-load. It is not so unfortunate that this diversion of energy occurs, because it could be allowed for if the effect were uniform and predictable. However, with the tolerances permitted to the various parts, this additional feature becomes an unfortunately broad variable, and the axial pre-load is no longer accurately enough predictable as a function of the torque applied.

The aforesaid disadvantages are especially critical in te use of collars which are inherently torque-limited. A well-known example of such a collar is shown in U.S. Patent No. 2,940,495, issued to Wing on June 14, 1960, entitled Lock Nut With Frangible Driving Portion. In this well-known fastener, driving surfaces are spaced from and joined to the body of the nut by a reduced section which shears upon the application of the design torque. When this section shears, it is no longer possible to apply torque to the nut. Therefore, should any of the energy be applied in variable or unpredictable levels to effects other than the axial pre-load, the axial pre-load will be unknown, and the design strength of the joint will not be reliably achieved.

It is an object of this invention to provide a fluid-sealing joint, and a fluid-sealing nut and bolt combination for the joint wherein variables derived from the fluid-sealing action are reduced to a minimum.

A nut utilized in this invention is adapted for engagement to a bolt of a class which has an external thread, an extrusion section, and a cylindrical shank. In the installation of this bolt a portion of the extrusion angle, and perhaps a portion of the shank, will project beyond the surface of a workpiece along with the external thread. The nut includes a body which has a central bore with an axis. A bearing face is adapted to be brought against the surface of the workpiece. An internal thread is provided in said bore, and a counterbore opens onto the bearing face. An annular, resilient, deformable sealing ring is seated in the counterbore, and it makes a full peripheral sealing contact with the boundary thereof. An inner wall on the sealing ring has a minimum diameter which is greater than the greatest diameter of the internal thread so as to clear any external thread which will thread into the internal thread. A deflectible lip on the sealing wall is placed adjacent to the inner wall and at least a part of this lip projects axially beyond the bearing face of the nut. The lip is axially relieved as it extends away from the central axis, whereby upon being pressed against the face of the workpiece, it deflects inwardly toward the central axis so as to press against and to make a peripheral sealing contact with the bolt.

According to a preferred but optional feature of the invention, the nut includes a reduced section which joins and spaces apart the body and a driver-engaging section that is adapted to be engaged and driven by a driver.

The above and other features of this invention will be fully understood from the following detailed description and the accompanying drawings in which:

FIGURE 1 is an axial cross-section of the presently preferred embodiment of a nut according to the invention;

FIG. 2 is a bottom view of FIG. 1;

FIG. 3 is a composite view of the joint of this invention, showing the nut of FIG. 1 in its set condition together with a bolt illustrating on the left side a maximum grip condition, and on the right side a minimum grip condition; and FIG. 4 is an axial cross-section showing another embodiment of the nut according to the invention.

A nut 10 according to the invention is shown in FIG. 1. This is in general configuration the nut of the said Wing Patent No. 2,940,495. It includes a body 11 having a flat annular bearing face 12 at a first end thereof, a tapered portion 13, a reinforcing bead 14, and a driver-engaging section 15 at the other end. The driver-engaging section may conveniently bear a hexagonal array of driving surfaces 16 which can be engaged by a conventional wrench.

A torque-limting means comprises a reduced section 20 formed by a groove 21 adjacent to the reinforcing bead. This reduced section has the least lateral cross-section between the driver-engaging section and the body, whereby the driver-engaging section shears off from and falls free of the body when a predetermined torque is exerted across this reduced section.

The nut further includes a central bore 25 with an internal thread 26. The bore has no thread in the driver-engaging section. This portion of the bore is larger than any thread which will engage the nut and will therefore make no contact with it so that the driver-engaging section can fall free. The internal thread terminates adjacent to a counterbore 27, which counterbore may conveniently have a cylindrical wall 28 and an end wall 29, walls 28 and 29 sometimes being referred to as a boundary.

An annular, resilient, deformable sealing ring 30 is seated in the counterbore so as to make a full peripheral contact with the boundary thereof. It need not be a fluid sealing contact, but must be such as to restrain the ring so that a portion of it can deform as stated below. Abutment against end wall 29 will accomplish this function. The ring has an inner wall 31 which has a diameter greater than the maximum diameter of the internal thread 26 in order that the sealing ring will clear any external thread which will thread into the internal thread of the nut. A deflectible lip 32 is formed on the sealing ring, preferably integrally therewith, and at least a portion of the lip projects axially beyond the bearing face of the nut. This lip is axially relieved as it extends away from the central axis and this is preferably accomplished as a frusto-conical surface as shown in FIG. 1. Other axially-relieved forms can be devised, such as stepped structures. However, the form illustrated has considerable advantages as will later be apparent. Conveniently, the sealing ring may be bonded into the counterbore such as by use of adhesives. The material of the ring will, of course, be impervious to the fluid being sealed against. A preferred substance for use in the ring is an elastomer, Teflon being one example.

A bolt 35 for use with this nut is shown in FIG. 3. This bolt may, but need not necessarily, have a head 36. It does have a cylindrical shank 37 and an external thread 38. In accordance with the construction of threaded bolts, there is a surface commonly known as an extrusion section 39. This is a transition section from the thread to the shank and ordinarily includes the incomplete threads resulting from thread rolling or, when the threads are cut, simply constitutes a sloped transition section. The term "extrusion section" includes both. In any event, in the bolts with which this invention is used, there will be a sloped section such as section 39 between the thread and the shank. If the nut and bolt are to be set from the same side, the bolt will be provided with a non-circular driver-engaging recess 40 adapted to engage a driver. A hexagonal recess as shown is suitable.

A joint utilizing the nut and bolt of the invention is shown in FIG. 3 in two conditions. On the left-hand side, the maximum grip condition is shown, and on the right-hand side, the minimum grip condition is shown. It illustrates that in conventional practice, all of the external thread, and some of the extrusion section will project beyond a surface 41 of a workpiece 42. (The workpiece may be one or more pieces.) The left-hand portion showing the maximum grip illustrates that only a portion of the extrusion section may project, while on the right-hand side the minimum grip portion shows that a portion of the cylindrical shank may also project beyond the surface 41. FIG. 3 shows the nut of FIG. 1 seated, with the reduced section sheared after application of the design torque.

FIG. 4 illustrates that a nut may be provided with the sealing features of this invention without also being an inherently torque-limited nut. In this case, nut 45 has a body 46 which may be a common hexagonal shape with an internal thread 47 and sealing ring 48 seated in a counterbore 49, all as described in the device of FIG. 1.

In FIG. 3 it will be noted that in both conditions of minimum and maximum grip (and of course of any condition in between the two), the projecting end of the sealing ring will have made contact with the surface of the workpiece after having passed the external thread of the bolt without any contact therewith. Thereafter, as the nut was tightened down, there will have been a slight but not particularly greater frictional reaction between the sealing ring as it turned against the workpiece. With the use of such self-lubricating materials as Teflon, this drag will have been quite slight. The material of the lip will have been deformed toward the central axis because of its axially-relieved shape. This deflection requires less energy than deformation of the more solid, restrained, ring sections above it. This causes the lip to deflect toward and against the bolt where it makes a full peripheral sealing contact therewith. In the maximum grip condition, it may make contact with an incomplete thread or perhaps with a purely tapered and interrupted portion of the extrusion section. In the minimum grip condition and in some of the conditions between them, the contact will have been made with the cylindrical wall, or perhaps with part of the extrusion section and the shank. It will be noted that none of the sealing material was deformed into contact with the bolt thread itself, so that no drag was exerted on the threads as the device was being tightened down. Also, there is a minimum of plastic distortion which would require energy otherwise useful in securing axial pre-load. There therefore results a good seal around the bolt which seals flow through hole 50 in the workpiece and during the course of the formation of which there was no substantial reaction which caused energy from the applied torque to be expended for anything but axial pre-load.

This device is simple to construct and results in a joint which can readily and reliably be calculated as to its strength and effects. The terms "nut" and "collar" have been used interchangeably, as have the terms "bolt" and "pin."

This invention is not to be limited by the embodiments shown in the drawings and described in the description, which are given by way of example and not of limitation.

What is claimed:

1. In combination: A solid workpiece with a hole therethrough, the hole extending from one surface of the workpiece to another, the hole having a cylindrical boundary wall and a central axis; a bolt with an external thread, an extrusion section, and a cylindrical shank in that order, the bolt fitting in the hole with the entire thread and at least a part of the extrusion section projecing axially outside the hole and beyond one of said surfaces of the workpiece; and a nut comprising: a body having a central bore with an axis, a bearing face bearing in full peripheral and unimpeded surface contact with said one of the surfaces of the workpiece, an internal thread in said bore engaging the thread on the bolt, a counterbore opening on to the bearing face, and an annular, resilient, deformable sealing ring seated in the counterbore, an inner wall on the said sealing ring bearing the minimum diameter of said ring, which minimum diameter is greater, throughout its full axial extent in its relaxed condition, than the greatest diameter of said internal thread so as to clear any external thread of the bolt which can thread into said internal thread, and a deflectable lip on said sealing ring adjacent to the said inner wall, the radially innermost part of which lip projects axially beyond the bearing face of the nut when in its relaxed condition, said lip being axially relieved as it extends away from the central axis, whereby having been pressed against said one of the surfaces of the workpiece, it is deflected inwardly towards the central axis, thereby pressing against and making a full peripheral sealing contact with the said one of said surfaces and also with that portion of the bolt which stands adjacent to the intersection of said one of said surfaces and the projecting portion of the bolt, but no part of the sealing ring contacting the external thread, there being no substantial volumetric compression of the sealing ring.

2. A combination according to claim 1 in which the lip is frusto-conical.

3. A combination according to claim 1 in which the sealing ring is made of an elastomeric material.

4. A combination according to claim 3 in which the lip is frusto-conical.

5. A combination according to claim 1 in which the sealing ring is bonded into the counterbore.

6. A combination according to claim 1 in which the body includes inherent torque-limiting means to limit the torque applicable thereto.

7. A combination according to claim 6 in which the nut includes a driver-engaging section adapted to be engaged and to be driven by a driver, and in which the torque-limiting means joins the driver-engaging section to the body, and yields at a predetermined torque level to disengage the driver-engaging section from the body.

8. A combination according to claim 7 in which the torque-limiting means comprises a reduced section which is unitary and continuous with the body and the driver-engaging section, which reduced section has the least lateral cross-section between the section and the body whereby the driver-engaging section shears off of and falls free of, the body when the predetermined torque is exerted across it.

9. A combination according to claim 7 in which the lip is frusto-conical.

10. A combination according to claim 9 in which the sealing ring is made of an elastomeric material.

References Cited

UNITED STATES PATENTS

| | | |
|---|---|---|
| 1,208,620 | 12/1916 | Moser. |
| 2,940,495 | 6/1960 | Wing _____ 85—61 X |
| 3,040,796 | 6/1962 | Gouverneur _____ 151—7 |
| 3,203,459 | 8/1965 | Coldren _____ 151—7 |
| 3,275,054 | 9/1966 | Ohl _____ 151—7 X |
| 3,339,003 | 8/1967 | Cessna. |

FOREIGN PATENTS 630,809  12/1962  Italy.

RAMON S. BRITTS, Primary Examiner

U.S. Cl. X.R.

85—1, 61

UNITED STATES PATENT OFFICE
CERTIFICATE OF CORRECTION

Patent No. 3,482,864                 Dated   December 9, 1969

Inventor(s) Jerry M. Bynum

It is certified that error appears in the above-identified patent and that said Letters Patent are hereby corrected as shown below:

Column 1, line 13, after "hole" insert -- , --

Column 1, line 32, change "technique" to --techniques--

Column 1, line 62, change "te" to --the--

Column 3, line 67, change "greater" to --great--

SIGNED AND
SEALED
MAY 12 1970

(SEAL)
Attest:

Edward M. Fletcher, Jr.
Attesting Officer

WILLIAM E. SCHUYLER, JR
Commissioner of Patents